No. 688,513. Patented Dec. 10, 1901.
R. A. HAMMOND.
ROPE COUPLING.
(Application filed Apr. 6, 1901.)
(No Model.)

WITNESSES
Henry Marsh.
F. O. Spaulding

INVENTOR.
Robert A. Hammond,
by P. E. Teschemacher
Atty.

UNITED STATES PATENT OFFICE.

ROBERT A. HAMMOND, OF SANDWICH, MASSACHUSETTS.

ROPE-COUPLING.

SPECIFICATION forming part of Letters Patent No. 688,513, dated December 10, 1901.

Application filed April 6, 1901. Serial No. 54,722. (No model.)

*To all whom it may concern:*

Be it known that I, ROBERT A. HAMMOND, a citizen of the United States, residing at Sandwich, in the county of Barnstable and State of Massachusetts, have invented certain Improvements in Rope-Couplings, of which the following is a specification.

My invention relates to a coupling device which is especially adapted for connecting the ends of rope composed of wire and fibrous material and employed for the transmission of power; and my invention has for its object to provide a simple, strong, and durable coupling of this character whereby the ends of the rope will be securely held together without liability of being pulled out of the coupling under severe strain.

To this end my invention consists in a rope-coupling comprising two screw-threaded cups connected together by a central plug or connecting-piece, having its opposite ends threaded to engage the corresponding threads of the cups, which are adapted to receive the ends of the rope to be secured within the same, as hereinafter more fully set forth.

My invention also consists in certain other novel features and details of construction, as will be hereinafter fully described, and specifically pointed out in the claims.

Figure 1:
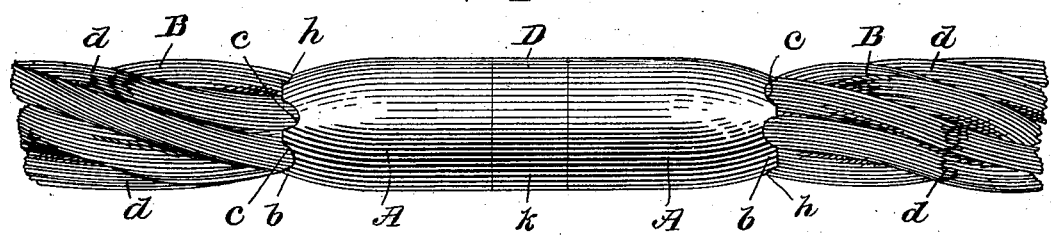
Figure 2:
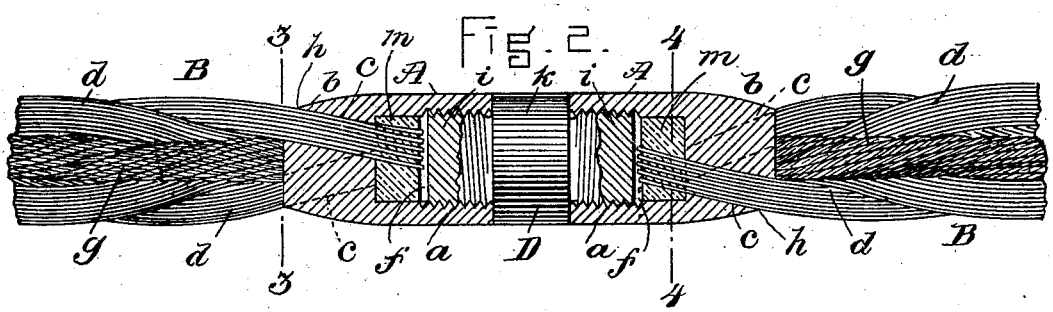
Figure 3:
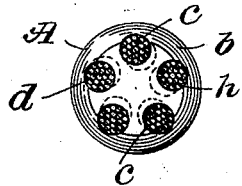
Figure 4:
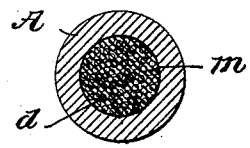

In the accompanying drawings, Figure 1 is a side elevation of my improved rope-coupling. Fig. 2 is a central longitudinal section of the same. Fig. 3 is a transverse section on the line 3 3 of Fig. 2. Fig. 4 is a transverse section on the line 4 4 of Fig. 2.

In the said drawings, A A represent two metallic cups, each of which is threaded interiorly, as at $a$, and is tapered slightly at its outer closed end $b$, as shown. Through the end $b$ are bored a series of holes $c$, corresponding in number to the wire strands $d$ of the piece of rope B to which the cup A is to be secured, said strands being passed through these holes, so as to extend into the chamber $f$ of the cup, as shown in Fig. 2, after which the wires are spread apart and the strands securely fastened in place, preferably by pouring in melted Babbitt metal $m$, which when cold will prevent any possibility of the rope becoming disconnected from the cup. The strands may, however, be secured in place within the chamber $f$ by means of wedges or in any other suitable manner. The holes $c$ are arranged in a circle, as shown in Fig. 3, the portion of the surface of the outer end of the cup which lies within the circle of holes being of a size corresponding to the diameter of the rope core $g$, the end of which is adapted to lie closely against the end of the cup when the wire strands $d$ are in place, as shown in Fig. 2, the core being thereby kept in line with the axis of the cup and the rope caused to retain its shape while passing over a sheave. The holes $c$ are inclined toward the longitudinal axis of the cup, so as to bring the ends of the strands $d$ nearer together within the chamber $f$, the diameter of which can thus be reduced and the strands more securely fastened in place, and said holes are also inclined to correspond to the spiral lay of the strands of the rope, which are thus prevented from straightening out and the perfect twist of the rope thus maintained. The outer ends of the holes $c$ extend through the tapered exterior surface $b$ of the cups, as shown at $h$, Figs. 1 and 2, so that a portion of each wire strand $d$ will project beyond said tapered surface to enable it to contact with the groove of the sheave over which the rope passes, thereby avoiding undue friction and wear and enabling the coupling to pass onto the sheave without noise and preventing the sharp edges of the ends of the cups from coming into contact with the sheave.

The two cups A A having the ends of the rope secured thereto are connected together by a central plug or connecting-piece D, the ends $i\ i$ of which are turned down and provided one with a right and the other with a left hand screw-thread, adapted to engage the corresponding internal threads $a\ a$ of the cups A A, a central cylindrical portion $k$ being left between the two threaded ends of the plug D of a diameter corresponding to that of the ends of the cups against which it abuts, leaving a smooth unbroken finish throughout the entire length of the coupling the diameter of the central portion of which equals that of the rope B. By providing the ends of the plug D with right and left hand screw-threads, as shown, the liability of the coupling becoming unscrewed is avoided and the lay of the rope properly maintained as required.

The above-described coupling is designed especially for uniting the ends of a piece of wire rope running over pulleys or sheaves and employed for the transmission of power; but my coupling may be used to advantage wherever two pieces of wire rope are to be connected together.

What I claim as my invention, and desire to secure by Letters Patent, is—

1. A rope-coupling comprising, a cup-like member provided with a series of holes through its closed or solid end for the individual strands of a rope, and a connecting-piece or plug closing the open end of the cup-like member.

2. A metallic rope-coupling comprising two threaded cups each having its outer end tapered and provided with a series of holes adapted to receive the strands of the rope to be secured within said cup, combined with a central plug or connecting-piece having its opposite ends threaded to engage the corresponding threaded portions of the cups, substantially as described.

3. A metallic rope-coupling comprising two threaded cups each having its outer end tapered and provided with a series of holes for the reception of the strands of the rope to be secured within said cup, said holes being inclined toward the axis of the cup and also to correspond to the spiral lay of the strands of the rope, combined with a central plug or connecting-piece having its opposite ends threaded to engage the corresponding threaded portions of the cups, substantially as described.

4. A metallic rope-coupling comprising two threaded cups each having its outer end tapered and provided with a series of holes for the reception of the strands of the rope to be secured within said cup, said holes being arranged in a circle and extending at their outer ends through the tapered exterior surface of the cup, whereby the rope strands will project beyond said tapered surface to contact with the groove of the sheave over which the rope passes, combined with a central plug or connecting-piece having its opposite ends threaded to engage the corresponding threaded portions of the cups, substantially as described.

Witness my hand this 4th day of April, A. D. 1901.

ROBERT A. HAMMOND.

In presence of—
P. E. TESCHEMACHER,
F. B. SPAULDING.